(12) United States Patent
King

(10) Patent No.: US 10,004,240 B2
(45) Date of Patent: Jun. 26, 2018

(54) FISH STUNNING APPARATUS, TRIGGER UNIT AND METHOD FOR INITIATING THE STUNNING MEANS OF THE FISH STUNNING DEVICE

(71) Applicant: Nordischer Maschinenbau Rud. Baader GmbH + Co. KG, Lubeck (DE)

(72) Inventor: Graeme Neville King, Cleveland Queensland (AU)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days. days.

(21) Appl. No.: 15/505,919

(22) PCT Filed: Aug. 22, 2014

(86) PCT No.: PCT/EP2014/067946
§ 371 (c)(1),
(2) Date: Feb. 22, 2017

(87) PCT Pub. No.: WO2016/026540
PCT Pub. Date: Feb. 25, 2016

(65) Prior Publication Data
US 2017/0265486 A1    Sep. 21, 2017

(51) Int. Cl.
*A22B 3/08* (2006.01)
*A01K 61/95* (2017.01)
*A22B 1/00* (2006.01)

(52) U.S. Cl.
CPC .............. *A22B 3/083* (2013.01); *A01K 61/95* (2017.01); *A22B 1/00* (2013.01)

(58) Field of Classification Search
CPC .................................. A22B 3/00; A22B 3/083
(Continued)

(56) References Cited

U.S. PATENT DOCUMENTS 6,001,011 A    12/1999    Johnson
6,183,356 B1 *    2/2001    Middleton ............. A22B 3/083
                                                                452/196
(Continued)

FOREIGN PATENT DOCUMENTS

CA    2863817 A1    8/2013
EP    1908353 A1    4/2008
(Continued)

OTHER PUBLICATIONS

International Search Report dated Jun. 11, 2015 from International Patent Application No. PCT/EP2014/067946 filed Aug. 22, 2014.
(Continued)

*Primary Examiner* — Richard T Price, Jr.
(74) *Attorney, Agent, or Firm* — Sunstone IP

(57) ABSTRACT

A fish stunning apparatus comprises a fish feed-in device, a fish receiving space, which is loadable with fish in the head first position, a fish positioning means, which engages on the fish head and, for the purpose of stunning the fish, defines a releasable temporary stop position of the fish, said apparatus also comprises a stunning means for acting on the fish head, a trigger device for determining the stop position and for activating the stunning means, and further comprises a control device for controlling operation.
Locations on the fish head which come to rest in the fish receiving space, depending on the size of the head and/or body of the fish, should be positioned optimally for the purpose of stunning. A fish position actuating element can be controlled by means of a fish-size determining device and is connected to a positioning element of the fish positioning means for local adjustment, as a result of which any fish head can be moved automatically, according to the size of the fish, into a consistent position in relation to the stunning means. A trigger unit, which can be installed in the fish stunning apparatus, comprises the fish position actuating
(Continued)

element with a trigger abutment element, formed by the positioning element, and also comprises a controllable control actuator for actuating the fish position actuating element.

According to a method for activating the stunning means, a fish-size-related control value, which represents the size of any fish, is determined and the positioning element is put automatically, according to the size of the fish, into an associated starting position.

25 Claims, 3 Drawing Sheets

(58) Field of Classification Search
USPC .................................. 452/52–54, 61–63, 66
See application file for complete search history.

(56) References Cited

U.S. PATENT DOCUMENTS

| | | | |
|---|---|---|---|
| 6,769,976 B2 * | 8/2004 | Bass | A22B 3/083 452/57 |
| 7,220,177 B2 * | 5/2007 | King | A22B 3/083 452/62 |
| 7,575,507 B2 | 8/2009 | King et al. | |
| 7,980,925 B2 * | 7/2011 | Bass | A22B 3/083 452/57 |
| 2006/0194531 A1 | 8/2006 | King et al. | |
| 2007/0204503 A1 | 9/2007 | King et al. | |
| 2010/0178859 A1 | 7/2010 | Bass | |
| 2014/0378038 A1 | 12/2014 | Baeza | |

FOREIGN PATENT DOCUMENTS

| | | |
|---|---|---|
| GB | 2391446 A | 2/2004 |
| WO | 2011021071 A1 | 2/2011 |
| WO | 2012020283 A1 | 2/2012 |

OTHER PUBLICATIONS

International Preliminary Report on Patentability dated Feb. 28, 2017 from International Patent Application No. PCT/EP2014/067946 filed Aug. 22, 2014.

* cited by examiner

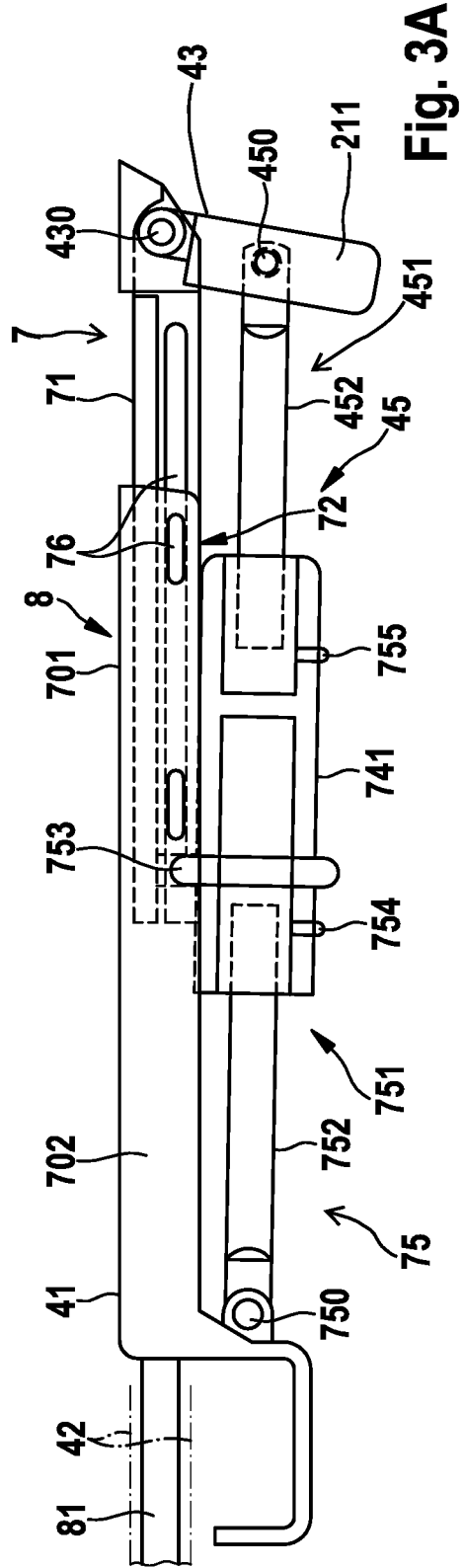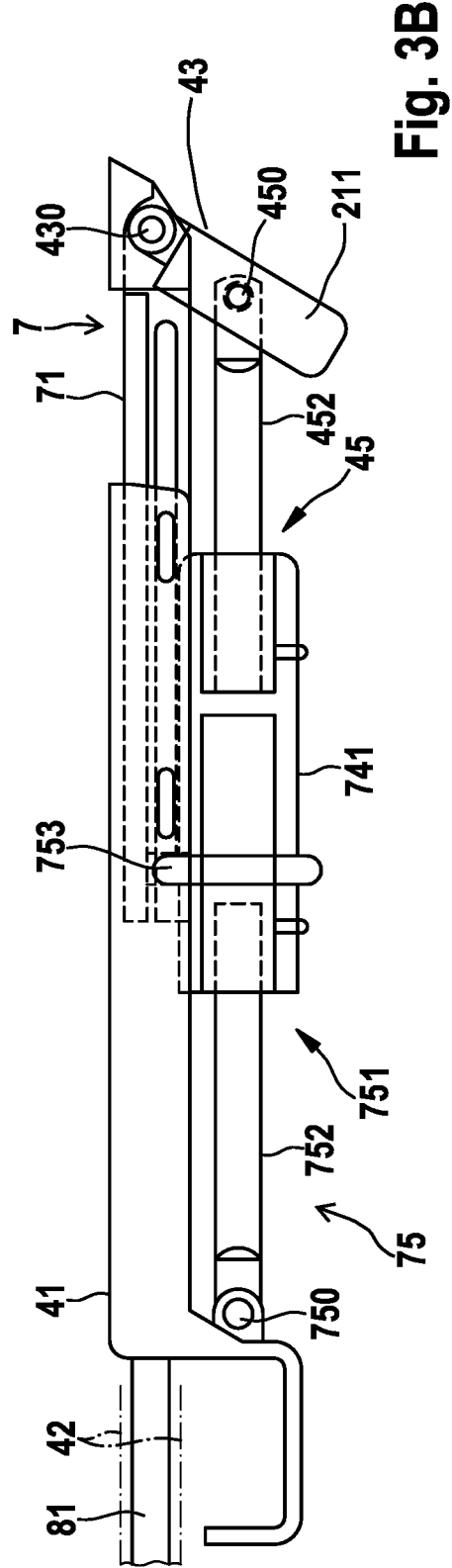

FISH STUNNING APPARATUS, TRIGGER UNIT AND METHOD FOR INITIATING THE STUNNING MEANS OF THE FISH STUNNING DEVICE

CROSS REFERENCE TO RELATED APPLICATION(S)

This application is a U.S. National Stage Entry of International Patent Application No. PCT/EP2014/067946, filed Aug. 22, 2014, the disclosure of which is hereby incorporated entirely herein by reference.

BACKGROUND

Technical Field

The invention relates to a fish stunning apparatus, comprising a fish feed-in device which is configured for conveying fish head first, a fish receiving space which is loadable with fish in the head first position by the fish feed-in device, a fish positioning device with a fish positioning means which engages on the fish head, which positioning means, for the purpose of stunning the fish, defines a temporary stop position of the fish in the fish receiving space, said stop position being releasable after stunning for discharging the fish, a stunning means for acting on the head-end region of the fish in its temporary stop position in the fish receiving space, a trigger device by means of which the temporary stop position is determinable and operation of the stunning means for acting on the head-end fish region can be activated, and a control device which for controlling operation is operatively connected to the fish positioning device, the stunning means and the trigger device.

The invention also relates to a trigger unit designed for installation in the fish stunning apparatus and to a method for activating a stunning means of a fish stunning apparatus.

State of the Art

A fish stunning apparatus of the type mentioned is disclosed, for example, in EP 1 908 353 A1. The apparatus is such that fish are fed in individually consecutively along the fish feed-in device, each fish arriving in a fish receiving space in the ventral position and with its head first. Located therein is a movably supported positioning and trigger abutment element of a trigger device. The fish head strikes under the fish's own weight against the trigger abutment element which is thereby moved along an activation path and as a result initiates the operation of a mechanical stunning means, namely a firing pin or similar stunning tool which strikes the skull of the fish head in order to stun the fish. The stunning tool is movable between a retracted and an extended position, namely the striking position. The trigger device and the stunning means are connected to a control device, namely a pneumatic circuit. This is also connected to a further positioning element which is controlled for holding the fish and for releasing the fish after stunning is complete. The fish pass through the fish stunning apparatus with a flow of water in order to pass the stunning apparatus.

WO 2012/020283 A1 discloses a fish stunning apparatus which is equipped with a mechanical stunning means, namely a striking tool, the position of which can be changed depending on the fish size. Such a known apparatus requires means for mechanically measuring and controlling the position of the stunning means. The apparatus is complicated to construct and positioning of the stunning means is not satisfactory.

A fish stunning apparatus is disclosed in GB 2 391 446 A which has a device for determining the head position in relation to the longitudinal direction of the stunning apparatus. The fish is conveyed continuously, a control device calculating the point in time for activating the stunning means and initiating a stunning stroke at the point of the calculated position of the fish. This known fish stunning apparatus must be operated with continuously conveyed fish and the activation time of the stunning tool requires a special calculation algorithm.

SUMMARY

The object of the invention is to improve stunning of the fish introduced into the fish receiving space of the generic apparatus in such a manner that points on the fish head for the action of the stunning means, said points coming to rest in the processing position of the fish depending on its head and/or body size, are optimally positioned for stunning with simple means. Automatic operation of the fish-stunning apparatus should not be interrupted by manual adjustment work. In particular, the fish should be reliably released from the automatically operated positioning means.

The objectives are achieved in conjunction with the features of the fish stunning apparatus referred to hereinbefore in that the fish positioning device is configured with a fish-size determining device determining the fish size and with a fish-position actuating element controllable by means of said fish-size determining device, which is connected to the fish positioning means for local adjustment thereof, as a result of which each fish head can be moved automatically, according to the size of the fish, into a consistent position in relation to the stunning means to bring about the temporary fish stop position.

With the invention, it is possible for any fish to be correctly positioned with at least one defined action point in the head region in its stop position in the fish receiving space in relation to the stationary arrangement of the stunning means or in relation to at least one stunning or slaughtering tool supported by said stunning means. The stop or non-operative position is understood to be a processing position of the fish in which it strikes with its own weight against a trigger abutment element in the fish receiving space, the trigger abutment element forming a positioning element of the positioning means and as a result of the impact for activating the trigger device being displaced into the stop position. The positioning means is therefore displaceable with at least one element under contact or pressure force. Expediently, the base of the fish receiving space is formed by a sliding surface which is inclined downwards in the conveying direction. According to the invention, fish, depending on their fish size and therefore according to the size of the fish, arrive in associated different predetermined stop positions, in such a manner that relevant processing points or action points on the head that are to be struck come to rest similarly and therefore consistently in relation to the stunning means or its tool. It requires only simple local adjusting displacement of the fish positioning means which limits the fish receiving space at its end directed towards the fish head and changes its size. Particularly reliable operation of the apparatus is achieved, and stunning or slaughtering of the fish is ensured with optimum effect of the stunning means, without impairment due to a change in size of the fish. The determinable fish size is understood to include at least one determinable fish size value which is obtained directly as a dimension or is derived from a determined geometry of the passing fish. In particular, the body size and/or the head size is determined. Each fish can also be weighed if necessary with scales, in addition to measurement of the dimensions, for determining a fish size value.

An especially preferred design consists in that the position actuating element forms part of the trigger device, the trigger device being activated, depending on local positions of the position actuating element which are displaceable and fixable on said trigger device, said positions being controllable preferably infinitely variably by means of the fish size controller. The trigger device is operated directly, depending on the controlled and therefore preset position of the positioning means, for activating the stunning means. By means of the fish position actuating element, the controllable positioning means is movably supported on a trigger body, e.g. a housing or similar, for position setting.

One design consists in that the fish position actuating element is formed by an adjusting carriage element which is slidingly movably supported and can be fixed in a specific sliding position on the trigger device by the fish-size controller. For example, such an adjusting carriage element can easily be accommodated and moved in a sliding support arranged on a trigger body of the trigger device. Advantageously, the carriage element is formed by a sliding block made of low-friction material, e.g. an acetyl plastic.

One advantageous embodiment consists in that arranged on the trigger device is a control actuator forming a drive of the fish position actuating element, said control actuator being controllable for driving and fixing the fish position actuating element according to the size of the fish. Such a control actuator is arranged spatially between a trigger body and the fish position actuating element supported thereon. The control actuator is in any case designed and configured in such a manner that it can be moved into the position predetermined by the controlling by means of a control signal, which is transmitted by the fish-size determining device directly or indirectly via a control device of the fish stunning apparatus, and is held in this position, that is to say is fixed. Advantageously, the control actuator is formed by a controllable pressure piston cylinder. Expediently, the piston rod of such a pressure piston cylinder, which is advantageously designed as a pneumatic cylinder, is mounted on the trigger body of the trigger device, while the fish position actuating element is held in engagement with the cylinder housing, for example by means of a pusher dog such as a projection or a shoulder on said cylinder housing.

Advantageously, the trigger device has a trigger abutment element which forms a positioning element of the fish positioning means and is displaceable out of a starting position for activating the stunning means, the trigger abutment element being connected to the fish position actuating element for adjusting into different basic positions. In one embodiment, such a trigger abutment element can be designed as an element that is formed by a top surface of the fish position actuating element. Another advantageous embodiment consists in that the trigger abutment element is hinged on the fish position actuating element and on the trigger device. A special design is achieved in that the fish position actuating element has a positioning element connected to the fish position actuating element, said positioning element being spring-mounted on the trigger device. In any case, a maximum spring damping path is equally advantageous for all fish sizes.

One embodiment consists in that arranged on the trigger device is an abutment actuator which is configured to drive a trigger abutment element which is movably mounted on the fish position actuating element and forms a fish positioning element of the fish positioning means. Advantageously, the fish positioning element is pivotably hinged on the fish position actuating element and the abutment actuator forms a pivot drive. Advantageously, the abutment actuator is formed by a controllable abutment pressure piston cylinder.

An especially preferred and designed embodiment consists in that the abutment actuator is designed as a controllable drive element connected to the apparatus control device, the apparatus control device being configured and designed in such a way that the trigger abutment element, on reaching the temporary fish stop position from a basic position, is moved, in particular is pivoted, in a direction away from the fish into a trigger release position and after release of the fish is moved back into the basic position. On the one hand, the abutment element is operated particularly optimally in its basic position by the abutment of the fish head during the activating movement, and on the other hand, the fish head is reliably released by the trigger abutment element immediately after stunning.

A special embodiment consists in that a double pressure piston cylinder is arranged on the trigger device, a first cylinder, namely an adjustment pressure piston cylinder, forming a control actuator for driving and fixing the fish position actuating element and a second pressure piston cylinder, namely an abutment pressure piston cylinder, forming an abutment actuator for driving, preferably pivot driving, a movable, preferably a pivotable, trigger abutment element mounted on the fish position actuating element, said trigger abutment element forming a fish positioning element of the fish positioning means. The first pressure piston cylinder and the second pressure piston cylinder are advantageously constructed with one and the same cylinder housing. A special embodiment consists in that a first piston rod which belongs to the adjustment pressure piston cylinder is hinged at a trigger body of the trigger device and that a second piston rod which belongs to the abutment pressure piston cylinder is hinged at the positioning element of the fish positioning means, a cylinder housing of the double pressure piston cylinder being displaceable and fixable along the first piston rod and the fish position actuating element for adjusting being in engagement with this cylinder housing.

One embodiment consists in that the fish-size determining device has a measuring element which determines a fish size value in space and time before the fish is conveyed into the fish receiving space.

According to one design, it is provided that the apparatus control device for controlling the fish position actuating element is configured with a logic controller which is connected to the fish-size determining device. The logic controller is advantageously formed by a programmable logic controller (PLC).

In particular, the mechanical stunning means can be constructed in a manner known per se. Thus the stunning means comprises, for example, a percussion piston which is operated by means of an actuating device, in particular a controlled pneumatic device. This is configured in conjunction with a pneumatic circuit which is initiated as a result of an activating movement of the trigger device. In particular, the pneumatic circuit is part of the apparatus control device. As usual, the stunning means can be provided as part of a slaughtering means which per se, in addition to the stunning means, has a bleeding means which, for example, in the form of a knife can be inserted between the gill cover and the head or body of the fish for cutting the main artery. A bleeding tool is controlled and operated similarly to a stunning tool. This means that the bleeding tool is also arranged to be stationary and, as a result of the fish size controller, engages consistently in the case of fish of different head/body size at the same point of the fish which is optimum for processing. The controller is configured such that a stunning tool is initiated or activated chronologically before a bleeding tool.

According to one design, the fish positioning means in a manner known per se has a controlled release element separate from a trigger abutment element with which the fish after slaughtering, that is to say after deactivation of the stunning tool or bleeding tool, is released in a controlled manner from the fish receiving space. This release element, for example as a positioning element in the form of a swing-hinged base, is also arranged to be stationary, and is operated by means of said controller. To limit the fish receiving space, the release positioning element is always expediently brought into the same stop/lock position.

According to the invention, a method for activating a stunning means for stunning a fish, which acts on the head-end fish region, consists in that the fish is positioned with its head region under the stunning means in a temporary stop position by abutment with a positioning element engaging on the fish head, the positioning element which forms a trigger abutment element for activating the stunning means being moved from a starting position into an end position, in which an initiator is activated for activating the stunning means, a fish size value representing the size of any fish being automatically determined as a fish size control value and the positioning element, according to the determined size of the fish, being moved automatically using the fish size control value into an associated designated starting position and set such that different basic positions are adjusted in relation to a trigger body. This adjusting displacement of the fish positioning element preferably takes place continuously (steplessly variably). The starting position and the end position determine a short constant activation path which is in the range, for example, of one millimeter or a few millimeters. Advantageously, the activating movement of the positioning element from the starting position into the end position and an adjusting movement of the positioning element for controlled moving of the same into the starting position is carried out along a common straight line of movement.

A special procedural measure consists in that in any case the positioning element, on reaching the end position, is moved out of a basic position away from the fish head to release the fish and after releasing the processed fish is moved back into the basic position.

The invention also provides for an independently manageable module mounting component for mounting in the trigger device. Such a trigger unit, configured for installation in a fish stunning apparatus according to the invention, comprises a trigger body, which is configured with a mounting element for displacing the trigger unit along a trigger activation path, a fish position actuating element displaceably mounted on the trigger body, on which actuating element a positioning element is arranged which forms a trigger abutment element for the impact connection with a fish head, and a controllable control actuator for controlled moving and fixing of the fish positioning element in different basic positions, the control actuator being mounted on the trigger body and having a controllable drive element which is in engagement therewith for controlled moving and fixing of the fish position actuating element.

The trigger unit according to the invention can be particularly advantageously installed as a replacement or spare part in a trigger device known per se which is equipped with a corresponding trigger body, said body being mounted displaceably in a fish stunning apparatus for activation. The fish stunning apparatus is then also to be equipped with the associated fish control. The trigger unit can be designed to be particularly compact and lightweight. For activating the stunning means, the trigger device of the fish stunning apparatus is designed in any case with a defined activation path. The trigger unit is configured for displacement along this activation path. Advantageously, the position actuating element is so arranged and mounted on the trigger body and the trigger mounting element is so configured that the activating movement of the trigger body along the activation path as well as the controllable adjusting movement of the positioning element take place along a common straight line of movement. The modular design of the trigger unit also simplifies cleaning of the fish stunning apparatus.

Dependent claims are directed at the mentioned and also other expedient and advantageous embodiments of the invention. Only particularly expedient and advantageous embodiments or embodiment options will be described in greater detail, based on the following description of the embodiments illustrated in the schematic drawing. Each individual or detail design described within an embodiment should be understood as a structurally independent detail example for other embodiments and designs which fall within the invention that are not described or not fully described.

DETAILED DESCRIPTION OF EMBODIMENTS

Figure 1:
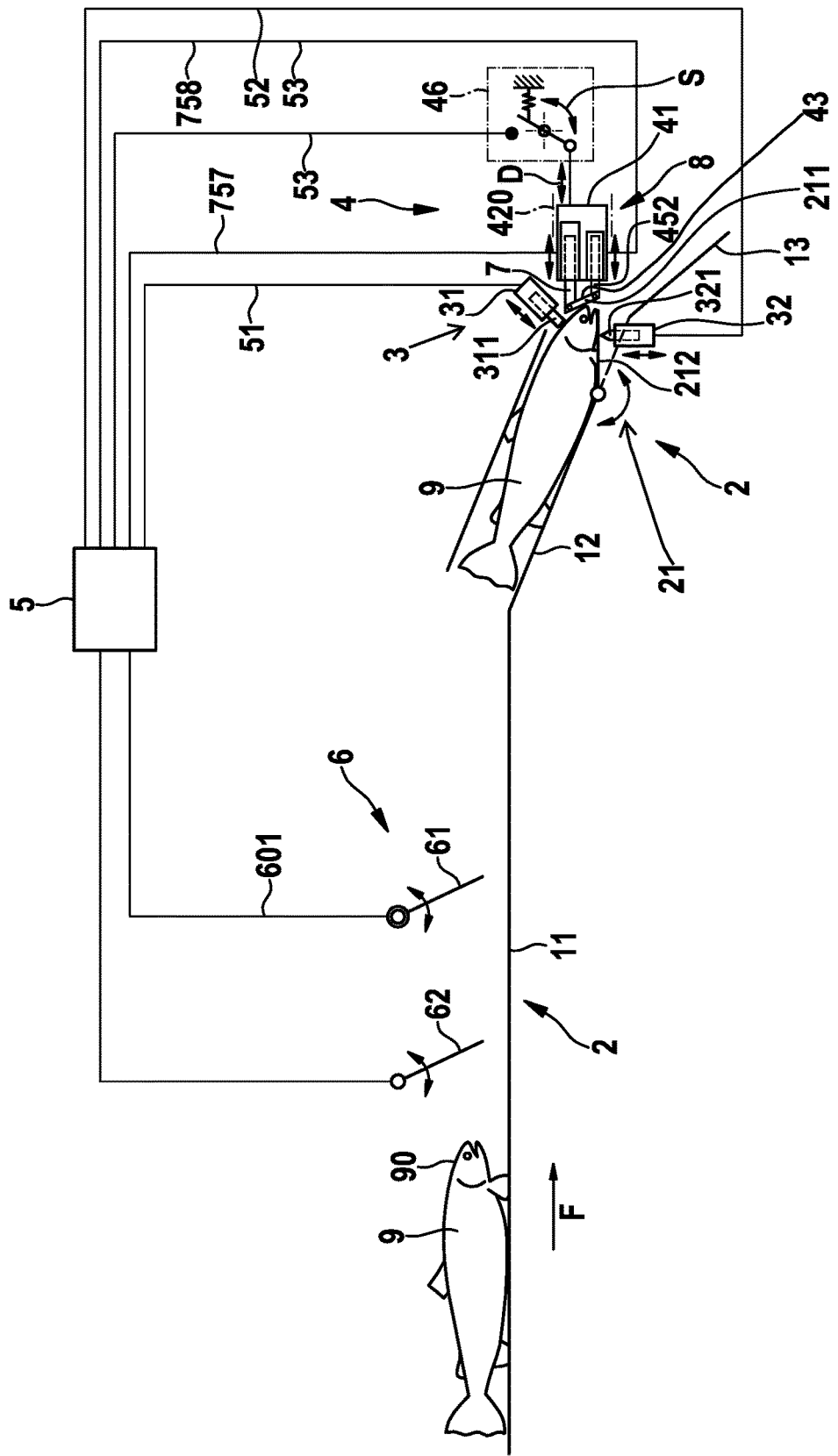
FIG. 1 a fish stunning apparatus according to the invention.

The fish stunning apparatus according to FIG. 1 is only illustrated with the parts and regions essential for the description of the invention. Devices and means associated with the fish stunning apparatus 1 are arranged and stored on an apparatus frame such as a rack or similar consoles which are not illustrated. The fish stunning apparatus 1 comprises a fish feed-in device 11, a fish receiving space 12, which can be charged by said fish feed-in device 11 with fish 9 in the head first position, a fish positioning device 2 with a fish positioning means 21 engaging on the fish head 90, a stunning means 31 which acts mechanically on the skull in the head-end region of the fish 9, a trigger device 4 with a trigger unit 8 by means of which operation of the stunning means 31 can be initiated for acting on the fish skull, and an apparatus control device 5 with which the said devices and means are functionally and operatively connected via signal/control lines.

Furthermore, a fish-size determining device 6 determining the size of the fish, a fish position actuating element 7 controllable by means of said fish-size determining device 6 and an associated control region or portion of the apparatus control device 5 are part of the fish positioning device 2.

The fish stunning apparatus 1 is configured such that fish 9 arrive consecutively in the fish receiving space 12 in conveying direction F in the ventral position and head first along a water flow by way of the fish feed-in device 11. A fish feed-in device can also be designed as an input space of the fish receiving space.

In FIG. 1, a fish 9 is located in the fish receiving space 12 for slaughter. The fish positioning means 21 is formed by a positioning element 211 and a release element 212. The positioning element 211 and the release element 212 form a positioning space in which the fish 9 is positioned at its head end by bringing about a stop/processing position. The front upper section of the head 90 comes to rest on the positioning element 211, and the release element 212 holds the fish on the underside of its head and body. The fish receiving space has a base with a sliding surface which is inclined downwards in the conveying direction. As a result, the fish 9 comes to rest against the positioning element 211 due to the contact force exerted by its own weight.

The fish stunning means 31 is assigned to the upper side of the fish head 90. The fish stunning means 31 is part of a slaughtering means 3 which also includes a bleeding means 32 with a bleeding tool 321, e.g. a knife. The bleeding means 32 is assigned to the underside of the fish in the region between head and gills for severing the main artery. The stunning means 31 and the bleeding means 32 are arranged stationary on the apparatus frame.

Special significance is attached to the positioning element 211 of the fish positioning means 21. The positioning element 211 is a trigger abutment element 43 of the trigger device 4 or the trigger unit 8 which is movable underneath the impact position of the fish 9 according to a trigger activation path. According to the invention, the positioning element 211 is movable into different basic positions according to the size of the fish. The positioning element 211 is connected to the fish-size determining device 6 in such a way via the apparatus control device 5 that according to the measured fish size it enlarges or reduces the size of the fish receiving space 12 on the head end in the direction of the fish. This ensures that the stunning means 31 with its stunning tool 311 always comes to rest in each case at a consistent point or position of each fish 9 which is optimally suited for stunning, namely in particular always approximately in the middle of the skull, and that is for fish 9 of different body and/or head size. Similarly, in each case the bleeding tool 321 comes to rest at the correct puncture site in the vicinity of the gill cover.

As can be seen in particular from FIGS. 2 and 3, the trigger unit 8 comprises a trigger body 41, extending with a longitudinal axis, in the form of a profile body, which forms a receiving space 72 with which the fish position actuating element 7, in the form of a carriage element 71, is displaceably supported along the length of the trigger unit 8. The receiving space 72 is U-shaped in the cross-section, not illustrated, with a web wall 701 and leg walls 702. As a result, the receiving space 72 is open on an underside and the fish position actuating element 7 is held slidingly movably in the longitudinal direction in the sliding fit by means of a carriage guide 76. The installation position can also be configured such that the fish-position actuating element comes to rest on the underside of the trigger unit.

The fish position actuating element 7 protrudes on a front side of the trigger body 41 out of the receiving space 72 with a free end. On this free end, the trigger abutment element 43 is pivotably hinged about an axis 430 perpendicular to the longitudinal axis, that is with pivot components towards the longitudinal axis. The other rear longitudinal end of the fish position actuating element 7 is in engagement with a drive element of a control actuator 75 which is designed as a controllable drive device.

The control actuator 75 is an integral part of a double pressure piston cylinder 74 which is arranged underneath the receiving space 72. The control actuator 75 is formed by an adjustment pressure piston cylinder 751 having a piston rod 752 projecting towards the rear of the trigger body 41, which piston rod is hinged to pivot movably on a rear wall of the trigger body 41 about an axis 750 parallel to the axis 430. The double pressure piston cylinder 74 has a cylinder housing 741 which is displaceable in the longitudinal direction of the trigger body 41. This forms the drive element of the actuator 75. A pusher dog 753 rigidly arranged on the drive element engages with a sliding movement in a recess on the rear end of the fish position actuating element 7. Engagement of the fish position actuating element 7 with the drive element is established as a result thereof. A drive/adjusting movement of the cylinder housing 41 produced with the adjustment pressure piston cylinder 751 is controlled by means of the apparatus control device 5 according to the fish size value determined with the fish-size determining device 6. The controlled drive movement of the adjustment pressure piston cylinder 751 takes place by appropriate pressure admission via at least one control opening which is designated with 754 in FIGS. 2 and 3. This adjustment pressure piston cylinder for example, as is known per se, is connected to a pressure generating device, not illustrated, for example a pneumatic control circuit which for its part is in control connection with the apparatus control device 5 or the fish-size determining device 6. This control connection is identified by 757 in FIG. 1.

An abutment actuator 45 is also an integral part of the double pressure piston cylinder 74. This has, on its front side directed towards the trigger abutment element 43, an abutment pressure piston cylinder 451. The associated piston rod 452 is pivotably hinged on the trigger abutment element 43 about a pivot axis 450 parallel to the pivot axes 430, 750. The piston rod 752 and the piston rod 452 work in a straight line of movement.

The abutment actuator 45 can be especially designed and operated. One embodiment consists in that the abutment actuator 45 is connected to the apparatus control device 5 via a control line 758. The apparatus control device 5 is designed and configured in such a manner that the trigger abutment element 43, on reaching the temporary fish stop position from its basic position, is pivoted in a direction away from the fish head into a trigger release position and after release of the fish 9 is pivoted back into the basic position. The basic position of the trigger abutment element 43 controlled and defined by means of the control actuator 75, namely the position in relation to the trigger body 41, which is set to impinge the fish head on the trigger abutment element 43, is advantageously maintained up to activation of the stunning means, that is up to reaching the stop position of the fish 9. The abutment actuator 45 is controlled via a control opening 755 for pivoting out and pivoting free the trigger abutment element 43.

The abutment actuator 45 can also or additionally form a damping device instead of said release device. For example, a maximum stroke of the piston rod 452 is configured. If a damping device alone is provided, the abutment pressure piston cylinder 451 can be formed by a spring or pressure element working passively.

The trigger unit 8 according to the invention is not limited to the embodiment with the double pressure piston cylinder 74. A release movement and/or damping of the trigger abutment element 43 can be omitted completely, the trigger abutment element 43 then being arranged as fixed to the body on the free end of the fish position actuating element 7.

The control actuator 75 and the abutment actuator 45 can also be formed by separate pressure piston cylinders. The control actuator 75 or the abutment actuator 45 can also be replaced by any other actively controllable drive for the control movement of the fish position actuating element 7 or the trigger abutment element 43.

With reference to FIGS. 2 and 3, it is possible to see the results of the position control of the trigger abutment element 43 which forms the positioning element 211 of the fish receiving space 12.

Figure 2A:
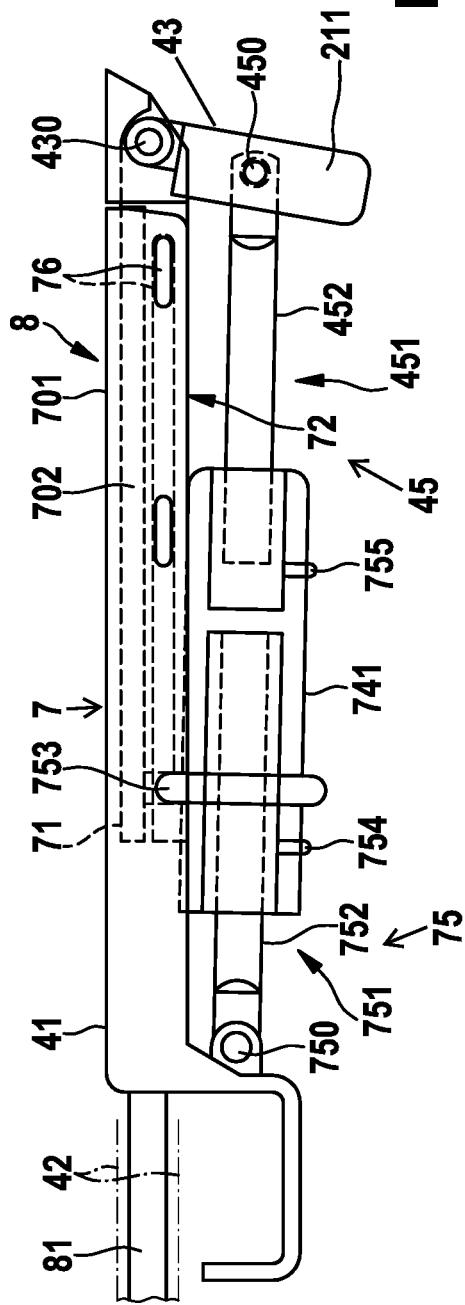
FIGS. 2A and 2B in a longitudinal lateral view a trigger unit of a trigger device according to the invention of a fish stunning apparatus according to the invention in a controlled setting for a relatively large fish and FIGS. 3A and 3B in a longitudinal lateral view a trigger unit of a trigger device according to the invention of a fish stunning apparatus according to the invention in a controlled setting for a relatively small fish.
Figure 2B:
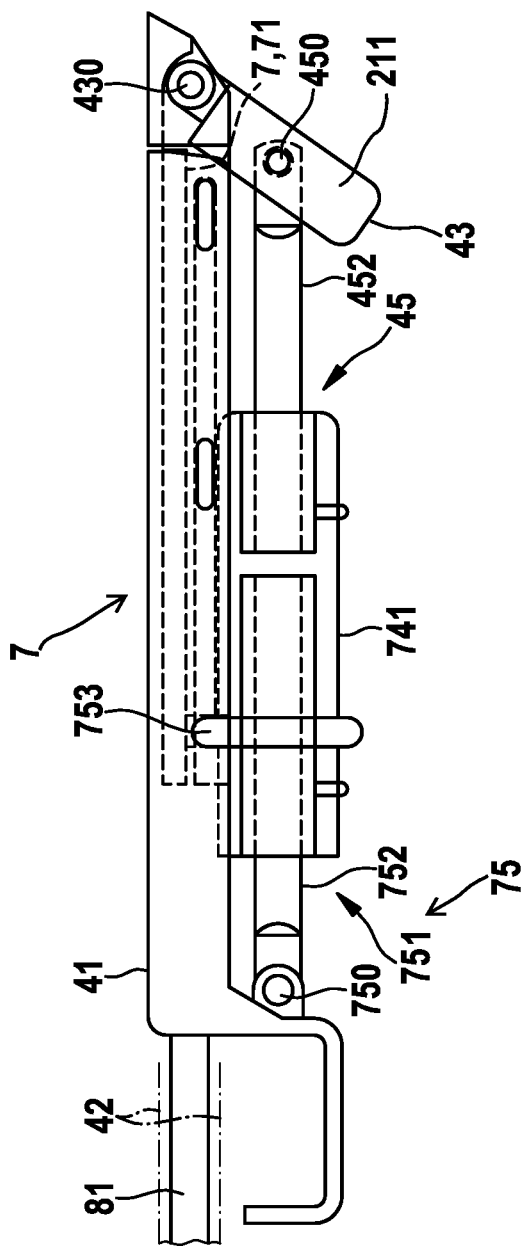

FIGS. 2A and 2B show controlled settings of the trigger abutment element 43 for a relatively large fish or relatively large fish head. In FIG. 2A, the trigger abutment element 43 is in a basic/starting position in relation to the trigger body 41. A pivot angle position and thus alignment of the trigger abutment element 43 can be maintained by controlling the abutment actuator 45 while the trigger body 41 is moved into the trigger activation position. The slaughtering tools 311, 321 are put into operation in the corresponding stop position of the fish 9. Immediately after the slaughter process, the trigger abutment element 43 is pivoted in a direction away from the fish head 90 into an opened release position. The associated pivot angle position is illustrated in FIG. 2B. In the embodiment shown, the fish position actuating element 7 is fully retracted into the receiving space 72 to adjust the basic position for the large fish 9.

The trigger body 41 has a mounting element 81 which is arranged in FIGS. 2 and 3 as a mounting rod or mounting plate on the rear end of the trigger body 41. The mounting element 81 is designed and configured in such a manner that the trigger unit 8 is supported in a mounting 42 of the fish stunning apparatus 1 for moving along the trigger activation path. The mounting 42 is arranged stationary on the apparatus frame, not illustrated.

The activation path is adjusted continuously, the associated activating movement ending when the trigger body 41 reaches a sensor or initiator 46, which is connected to the apparatus control device 5, and by means of this causes activation of the slaughtering means, namely in the embodiment of the stunning means 31 and the bleeding means 32. The associated control connections are denoted by 51, 52 and 53 in FIG. 1. It is possible to see that the activating movement of the positioning element 211 from a starting position into an end position and an adjusting movement of said positioning element 211 for controlled moving of the positioning element 211 into its basic position by means of the fish position actuating element 7 is carried out along a common straight line of movement. The abutment actuator 45 can be operated and/or designed such that the trigger activating movement takes place in conjunction with a damping movement. The trigger activating movement can follow the damping movement in time. These movements can also overlap each other.

In the embodiment of FIG. 1, the end of the activation movement or the activation path can be determined and effected by a limit switch. This has a double-arm activation/switching lever. A linear movement D of the trigger body 41 is converted into a pivot movement P of the activation lever which is pivoted against a restoring spring force into a defined limit position that is detected by means of the sensor and initiator 46. The invention is not limited, even in the embodiment shown, to such a device for determining and detecting the activation path for initiation of the controller and operation of said devices and means. Any other device which configures and detects the activation movement and resets the trigger device or the trigger body 41 back to the starting position at the end of the activation path can be provided. In FIG. 1, the mounting of the trigger unit 8 is schematically indicated at 420. A handle for manually activating the trigger device 4 arranged on the rear side of the trigger unit 8 in FIGS. 2 and 3 is not illustrated in FIG. 1.

FIG. 3A illustrates the case where a relatively small fish or a relatively small fish head 90 has been detected by means of the fish-size determining device 6. The trigger abutment element 43 which forms the positioning element 211 is located in a pivot angle position on the pivot axis 450 which is identical to the pivot position in FIG. 2A and which is advantageously maintained up to the trigger end position or the stop position of the fish 9. The release position (pivot angle position) according to FIG. 3B is identical to the position in FIG. 2B. The essential difference between FIGS. 2 and 3 consists in that in FIG. 3 the fish position actuating element 7 is extended relatively far by means of the controlled control actuator 75 such that the fish receiving space 12 with this basic position is correspondingly shortened so that the small fish head also detected comes to rest precisely positioned on the slaughtering means 3. Moreover, the operational and functional description regarding FIG. 2 applies equally to FIG. 3.

In the embodiment according to FIG. 1, the fish-size determining device 6 is equipped with an angle encoder 61 which determines the fish size or head size and converts it into an appropriate control value with which the apparatus control device 5 is pressurised via a control connection 601. The fish-size determining device 6 can be replaced by any other suitable fish-size determining device. The fish can also be weighed. The fish-size determining device 6 is arranged upstream of the fish receiving space 12 and/or is connected to a path tracker in such a manner that the determined fish size value is assigned in each case to the associated fish 9 arriving in the fish receiving space 12. In the embodiment, the fish-size determining device 6, upstream of the angle encoder 61 at the entrance to the fish stunning apparatus 1, also has a monitoring device 62 which is equipped with a pivotable gate and is connected to the apparatus control device 5 via a control line 602. By means of this device, it is ensured that the fish 9 are fed in individually so that they follow one another with a gap. Instead of or in addition to the angle encoder 61, the gate can be configured with a means, such as an angle encoder, for determining the fish size.

The described end position of the trigger abutment element 43 or the positioning element 211 at the end of the activation movement determines the actual stop position of the fish 9 in the fish receiving space 12. As already described, on the one hand the stunning means 31 is activated and on the other hand subsequently, usually after a few milliseconds, the bleeding means 32 is activated. As a result, the fish 9 slaughtered in this way arrives in a fish removal space or fish removal path 13 such that the release element 212 is activated by means of the apparatus control device 5 to open the fish receiving space 12 via a control line, not illustrated. Moreover, the described release of the trigger abutment element 43 by means of the controlled abutment actuator 45 ensures that the slaughtered fish 9 reliably comes clear without being caught on said trigger abutment element 43.

The apparatus control device 5 is configured with normal components per se of a computer device and electronic control system, if necessary in conjunction with control circuits, such as pneumatic control circuits, in such a manner that all devices and means are reset immediately to the initial condition after their activation such that the fish receiving space 12 is ready to receive and process the next fish 9. Advantageously, the apparatus control device 5 is equipped with a programmable logic controller (PLC). In particular, the fish size determination and the control system are programmed for different fish species and/or in adaptation to characteristics of body geometry and/or weight.

The invention claimed is:

1. A fish stunning apparatus, comprising
a fish feed-in device, which is configured for conveying fish head first,
a fish receiving space which is loadable by the fish feed-in device with fish in the head first position,
a fish positioning device having a fish positioning means engaging on the fish head which for the purpose of stunning the fish in the fish receiving space, defines a temporary stop position of the fish which is releasable after stunning for discharging the fish,
a stunning means for stunning acts on the head-end region of the fish in its temporary stop position in the fish receiving space,
a trigger device by which the temporary stop position is determinable and operation of the stunning means can be activated for acting on the head-end fish region, and
an apparatus control device which for controlling operation is operatively connected to the fish positioning device, the stunning means and the trigger device,
characterized in that
the fish positioning device is configured with a fish-size determining device determining the fish size and with a fish-position actuating element controllable by said fish-size determining device, which is connected to the fish positioning means for local adjustment thereof, as a result of which any fish head can be moved automatically, according to the size of the fish, into a consistent position in relation to the stunning means to bring about the temporary fish stop position.

2. The fish stunning apparatus according to claim 1, characterized in that the fish position actuating element forms a part of the trigger device, wherein the trigger device can be activated, depending on local positions of the position actuating element which are displaceable and fixable on said trigger device, said local positions being controllable by the fish size controlling.

3. The fish stunning apparatus according to claim 2, characterized in that a trigger body of the trigger device, on which the position actuating element is displaceably and fixably supported, is movably supported on a stationary mounting of the fish stunning apparatus for the activating movement along a defined activation path.

4. The fish stunning apparatus according to claim 2, characterized in that the trigger device has a trigger abutment element configured for abutment of a fish which forms a positioning element of the fish positioning means and is arranged to be displaceable out of a starting position, wherein the trigger abutment element is connected to the fish-position actuating element for adjusting into different basic positions.

5. The fish stunning apparatus according to claim 2, characterized in that the fish-position actuating element is formed by an adjusting carriage element which is slidingly movably supported and can be fixed in a specific sliding position on the trigger device by the fish-size controlling.

6. The fish stunning apparatus according to claim 2, characterized in that arranged on the trigger device is a control actuator forming a drive of the fish position actuating element, said control actuator being controllable for driving and fixing the fish-position actuating element according to the size of the fish.

7. The fish stunning apparatus according to claim 6, characterized in that the control actuator is formed by a controllable adjustment pressure piston cylinder.

8. The fish stunning apparatus according to claim 2, characterized in that arranged on the trigger device is an abutment actuator, which is configured to adjust a trigger abutment element movably articulated on the fish-position actuating element, which trigger abutment element forms a fish positioning element of the fish positioning means.

9. The fish stunning apparatus according to claim 8, characterized in that the abutment actuator is formed by a controllable abutment pressure piston cylinder.

10. The fish stunning apparatus according to claim 8, characterized in that the abutment actuator is designed as a controllable drive element connected to the apparatus control device, wherein the apparatus control device is configured and switched in such a way that the trigger abutment element, on reaching the temporary fish stop position from a basic position, is moved in a direction away from the fish head into a trigger release position and after release of the fish is moved back into the basic position.

11. The fish stunning apparatus according to claim 8, characterized in that the abutment actuator is designed as a damping element, wherein the trigger abutment element, when a fish head abuts it from a basic position, deflects in a direction away from the fish head against a restoring force by which the trigger abutment element, after release of the fish, is moved back into the basic position.

12. The fish stunning apparatus according to claim 2, characterized in that arranged on the trigger device is a double pressure piston cylinder which has an adjustment pressure piston cylinder that forms a control actuator for driving and fixing the fish position actuating element, and which has an abutment pressure piston cylinder which forms an abutment actuator for driving a trigger abutment element movably supported on the fish-position actuating element, said trigger abutment element forming a fish positioning element of the fish positioning means.

13. The fish stunning apparatus according to claim 12, characterized in that a first piston rod which belongs to the adjustment pressure piston cylinder is hinged at a trigger body of the trigger device and that a second piston rod which belongs to the abutment pressure piston cylinder is hinged at the positioning element of the fish positioning means, wherein a cylinder housing of the double pressure piston cylinder is displaceable and fixable along the first piston rod and wherein the fish-position actuating element for adjusting is in engagement with the cylinder housing.

14. A trigger unit, configured for installation in a fish stunning apparatus according to claim 2, comprising a trigger body, which is designed with a mounting element for displacing the trigger unit along an activation path, a fish position actuating element, on which a positioning element is arranged which forms a trigger abutment element for a fish head, and a controllable control actuator for controlled moving and fixing of the fish positioning element, wherein the control actuator is mounted on the trigger body and has a controllable drive element which is in engagement therewith for controlled moving and fixing of the fish-position actuating element.

15. The trigger unit according to claim 14, characterized in that the control actuator is formed by a controllable adjustment pressure piston cylinder.

16. The trigger unit according to claim 15, characterized in that the trigger unit has a double pressure piston cylinder, wherein an adjustment pressure piston cylinder forms the control actuator for driving and fixing the fish-position actuating element and a controllable abutment pressure piston cylinder for driving the positioning element is connected thereto, wherein the positioning element is movably supported on the fish-position actuating element.

17. The trigger unit according to claim 16, characterized in that a first piston rod which belongs to the adjustment pressure piston cylinder is hinged at a trigger body and that a second piston rod which belongs to the abutment pressure piston cylinder is hinged at the positioning element of the fish positioning means, wherein a cylinder housing of the double pressure piston cylinder is displaceable and fixable along the first piston rod and wherein the fish-position actuating element for adjusting is in engagement with the cylinder housing.

18. The trigger unit according to claim 14, characterized in that the trigger unit has an abutment actuator which is configured to drive the fish positioning element that is movably supported on the fish-position actuating element.

19. The fish stunning apparatus according to claim 1, characterized in that the fish-size determining device has a measuring element which determines a fish size value in space and time before the fish is conveyed into the fish receiving space.

20. The fish stunning apparatus according to claim 1, characterized in that the apparatus control device is configured to control the fish-position actuating element with a programmable logic controller.

21. A method for activating a stunning means for stunning a fish by acting on the head-end fish region, wherein the fish is positioned with its head region under the stunning means in a temporary stop position by abutment with a positioning element engaging on the fish head, wherein the positioning element which forms a trigger abutment element for activating the stunning means by abutment of the fish head is moved from a starting position into an end position corresponding to the stop position, in which end position an initiator is activated for actuating the stunning means, characterized in that a fish size value representing the size of any fish is automatically determined as a fish size control value and that the positioning element, according to the determined size of the fish, is moved automatically using the fish size control value into an associated designated starting position and set.

22. The method according to claim 21, characterized in that the activating movement of the positioning element from the starting position into the end position and an adjusting movement of the positioning element for controlled moving of the positioning element into the starting position is carried out along a common straight line of movement.

23. The method according to claim 21, characterized in that in any case the positioning element on reaching the end position is moved out of a basic position away from the fish head to release the fish and after releasing the processed fish is moved back into the basic position.

24. The method according to claim 21, characterized in that a fish stunning apparatus is used to carry out the method.

25. The method according to claim 21, characterized in that a trigger unit is used to carry out the method.

* * * * *